(12) United States Patent  
Cheung et al.

(10) Patent No.: US 8,234,701 B2  
(45) Date of Patent: Jul. 31, 2012

(54) SYSTEM, METHOD AND COMPUTER PROGRAM FOR REMOTELY SENDING DIGITAL SIGNAL(S) TO A COMPUTER

(76) Inventors: Andrew Cheung, Toronto (CA); Serguei Strakhov, Mississauga (CA)

(*) Notice: Subject to any disclaimer, the term of this patent is extended or adjusted under 35 U.S.C. 154(b) by 1082 days.

(21) Appl. No.: 11/260,433

(22) Filed: Oct. 28, 2005

(65) Prior Publication Data

US 2007/0101407 A1   May 3, 2007

(51) Int. Cl.  
*H04L 29/06* (2006.01)

(52) U.S. Cl. ............ 726/12; 713/153; 713/168

(58) Field of Classification Search .......... 713/153, 713/154, 162, 168, 169; 726/4, 11, 12, 30; 709/225, 229  
See application file for complete search history.

(56) References Cited

U.S. PATENT DOCUMENTS

| | | | |
|---|---|---|---|
| 5,915,119 A * | 6/1999 | Cone | 713/310 |
| 7,036,141 B1 * | 4/2006 | Hammarstrom et al. | 726/11 |
| 7,447,927 B2 * | 11/2008 | Siegmund | 713/310 |
| 2005/0058143 A1 * | 3/2005 | Kikuchi et al. | 370/401 |
| 2005/0180326 A1 * | 8/2005 | Goldflam et al. | 370/231 |
| 2005/0223248 A1 * | 10/2005 | Lim et al. | 713/300 |

* cited by examiner

*Primary Examiner* — Gilberto Barron, Jr.  
*Assistant Examiner* — Izunna Okeke

(57) ABSTRACT

A system is provided for accessing and/or controlling at least one first computer connected to a local computer network (target computer) from at least one remote computer (being remote from the local computer network), that includes: a server computer operable to act as an intermediary between the target computer and the remote computer; and at least one proxy computer linked to the server computer and the target computer that is send digital signal(s) to the target computer as a proxy computer. The server computer is responsive to a remote computer request and then sends a communication directing the proxy computer to send the digital signal(s) to the target computer. The target computer receives the digital signal(s) from the proxy computer and thereby achieves a state in which the target computer is operable to act on the digital signal.

26 Claims, 4 Drawing Sheets

SYSTEM, METHOD AND COMPUTER PROGRAM FOR REMOTELY SENDING DIGITAL SIGNAL(S) TO A COMPUTER

FIELD OF THE INVENTION

This invention relates to sending of digital signal(s) to computers from a remote computer. The invention relates more particularly to a solution for sending digital signal(s) to computers connected to a local computer network from a remote computer that is external to the local computer network.

BACKGROUND OF THE INVENTION

In many security conscious corporate environments, IT policies are defined and implemented for computer networks that impede access and/or control of computers that are part of the computer network by remote computers. For example, employees are often instructed to shut down or put into "SLEEP/STANDBY MODE" their personal computer connected to a local computer network (such as a LAN or WAN) before leaving the office. This tends to defeat the purpose of many solutions for accessing and/or controlling from the remote computer of the personal computer that has been shut off is no longer available for remote access/control. Typically, in this case where an attempt is made to remotely access/control the personal computer in question, an error message is received indicating that the personal computer is unavailable.

Prior art solutions exist that enable a remote computer to send a communication (a message or control signal) to a particular computer that is part of a computer network behind a firewall. These solutions include Virtual Private Network ("VPN") solutions as well as Dynamic DNS technology ("DDNS"). VPN solutions generally require that a port be opened on the VPN server, which results in security concerns. In regard to DDNS based solutions, a port on the firewall generally has to be opened and a publicly addressable IP address has to be associated with the remote computer. VPN solutions are generally expensive to implement, and also generally require the aforesaid port to be opened, which can also result in security concerns. While DDNS based solutions are generally less expensive than VPN based solutions, they generally provide less security than a VPN solution and require that an IP address of the remote device be known to the computer network. This adds to the time required to manage the sending of digital signal(s) to computers connected to the computer network from remote devices.

Technologies exist for waking up personal computers in the "SLEEP/STANDBY MODE". For example, U.S. Patent Publication No. 20050198219, assigned to International Business Machines Corporation, provides a "Unicast Messaging for Waking Up Sleeping Devices". This technology discloses a method for broadcasting wake-up messages to a personal computer from a remote computer provided the personal computer's network layer and link layer addresses are both available and known to the remote computer. In particular, this technology provides means for waking up a personal computer in "SLEEP/STANDBY MODE" by broadcasting a message to the "sleeping computer" using the network layer plus the link layer network address without using the known "wake-up on LAN" feature from the PC BIOS. It should also be understood that while there are benefits to this prior art technology, it does not apply to both the "SLEEP/STANDBY MODE" and the "SHUTDOWN MODE", and more importantly the use of the network layer is a requirement. Technically, when a personal computer is in its "SHUTDOWN MODE", the network layer address is either not available and/or invalid. Therefore, this technology does not generally work for personal computers in their "SHUTDOWN MODE".

There is a need for a system, computer program and method that enables sending of digital signal(s) to a computer connected to a local computer network such as a LAN, from a remote computer (i.e. that is remote from the local computer network). There is a further need for such a system, computer program and method that is secure, easy to implement, and easy to manage.

SUMMARY OF THE INVENTION

In accordance with one aspect of the present invention, there is provided a method of accessing and/or controlling at least one first computer connected to a local computer network (target computer) from at least one remote computer (being remote from the local computer network), comprising the steps of: providing a server computer that is operable to act as an intermediary between the target computer and the remote computer; providing a second computer on the local computer network that is operable to act as a proxy for the server computer to send digital signal(s) to the target computer (proxy computer); requesting from the remote computer that at least one digital signal be sent from the server computer to the target computer; in response to such request, server computer sending a communication to the proxy computer directing the proxy computer to send the at least one digital signal to the target computer; and target computer receiving the at least one digital signal from the proxy computer and thereby being operable to act on the at least one digital signal.

In accordance with another aspect of the invention, there is provided a system for accessing and/or controlling at least one first computer connected to a local computer network (target computer) from at least one remote computer (being remote from the local computer network), comprising: a server computer that is operable to act as an intermediary between the target computer and the remote computer; and at least one proxy computer on the local computer network, linked to the server computer and the target computer, the proxy computer being is operable to act as a proxy for the server computer to send digital signal(s) to the target computer; wherein the server computer is responsive to a request from the remote computer that at least one digital signal be sent from the server computer to the target computer; wherein the server computer is operable in response to the request to send a communication to the proxy computer directing the proxy computer to send the at least one digital signal to the target computer; and wherein the target computer is operable to receive the at least one digital signal from the proxy computer and thereby achieve a state in which the target computer is thereby operable act on the at least one digital signal.

In accordance with a further aspect of the invention, there is provided a computer program for enabling accessing and/or controlling of at least one first computer connected to a local computer network (target computer) from at least one remote computer (being remote from the local computer network), the computer program comprising computer instructions which when made available on a server computer define a server computer program, said server computer program comprising: a registration utility, the registration utility being operable to: interoperate with a proxy computer on the local computer network, linked to the server computer and the target computer, to obtain the then current location of the proxy computer, said current location being a public addressable IP address, a publicly un-addressable LAN/WAN IP address, or a current communication session between the proxy computer and the server computer; and interoperate with the target computer to obtain from the target computer a computer identifier and a computer network identifier for the target computer; and a locating utility, said locating utility being responsive to a request from the remote computer that at least one digital signal be sent from the server computer to the target computer, to in response to said request send a communication to the proxy computer directing the proxy computer to send the at least one digital signal to the target computer; and wherein the target computer is operable to receive the at least one digital signal from the proxy computer and thereby achieve a state in which the target computer is thereby operable to act on the at least one digital signal.

In accordance with yet another aspect of the present invention, there is provided a computer program for enabling accessing and/or controlling at least one first computer connected to a local computer network (target computer) from at least one remote computer (being remote from the local computer network), the computer program comprising computer instructions which when made available on the target computer define on the target computer a target computer program comprising: means for activating the target computer to send digital signal(s) to a server computer that acts as an intermediary between the target computer and the remote computer, by the target computer registering with the server computer and thereby providing to the server computer a computer identifier and a computer network identifier for the target computer; wherein the server computer in response to such registration of the target computer defines for the target computer a proxy computer on the local computer network, linked to the server computer and the target computer, obtains the then current location of the proxy computer, said current location being a public addressable IP address, a publicly un-addressable LAN/WAN IP address, or a current communication session between the proxy computer and the server computer; and wherein means is provided that is responsive to a digital signal received from the proxy computer acting as proxy for the server computer (said digital signal being received in response to a request from the remote computer that the digital signal be sent from the server computer to the target computer) so as to cause the target computer to achieve a state in which the target computer is thereby operable to permit the remote computer to access/control the target computer.

In accordance with still yet a further aspect of the present invention, there is provided a computer program for enabling accessing and/or controlling of at least one first computer connected to a local computer network (target computer) network from at least one remote computer (being remote from the local computer network), the computer program comprising computer instructions which when made available on a proxy computer on the local computer network and linked to the target computer define on the proxy computer a proxy computer program comprising: means for activating the proxy computer to send digital signal(s) to a server computer that acts as an intermediary between the target computer and the remote computer, by the proxy computer registering with the server computer and thereby providing to the server computer the then current location of the proxy computer, said current location being a public addressable IP address, a publicly un-addressable LAN/WAN IP address, or a current communication session between the proxy computer and the server computer; and means operable on the proxy computer that enable the proxy computer to act as a proxy for the server computer to send digital signal(s) to the target computer; and means responsive to a communication received from the server computer to send to the target computer a digital signal, said communication being in response to a request from the remote computer that the digital signal be sent to the target computer, the target computer being responsive to the digital signal to achieve a state in which the target computer is thereby operable to act on the digital signal.

BRIEF DESCRIPTION OF THE DRAWINGS

A detailed description of the preferred embodiment(s) is (are) provided herein below by way of example only and with reference to the following drawings, in which.

Figure 1:
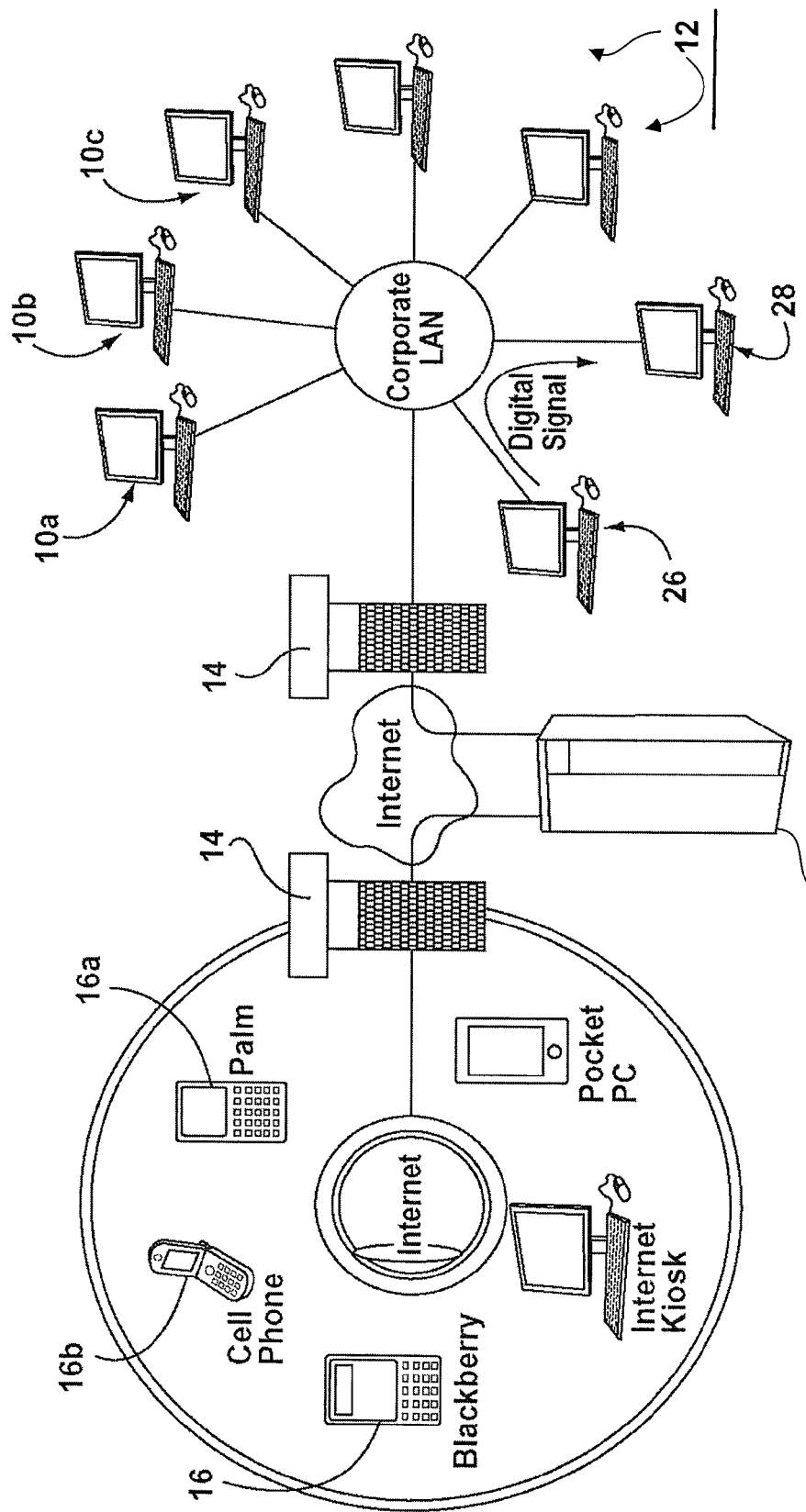
FIG. 1 is a system diagram illustrating the resources of the system of the present invention, in one particular embodiment thereof.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

In the following description, numerous specific details are set forth to provide a thorough understanding of the invention. However, it is understood that the invention may be practiced without these specific details. In other instances, well-known structures and techniques have not been described or shown in detail in order not to obscure the invention.

FIG. 1 illustrates a plurality of computers 10a, 10b, 10c etc. (referred to generally in this disclosure as computer 10) that are part of an internal computer network 12, such as a LAN or WAN. The computer network 12 is generally protected by a firewall 14.

Remote computers 16a, 16b, 16c etc. are referred to generally as remote computer 16. The remote computer 16 is also typically placed behind a firewall 14.

Each computer 10 is best understood as any manner of computer device that is typically part of a local computer network such as a personal computer, WLAN device or a distributed computer terminal. Each remote computer 16 can be any manner of a computerized device including a personal computer, pocket personal computer, handheld device, cell phone, Internet kiosk and the like.

A server computer 20 is also part of the system of the present invention. The server computer 20 consists of a central server that is operable to create and send one or more requests to the proxy computer(s) 26 (explained below) connected to the computer network 12.

Each of the computer 10, the server computer 20 and the remote computer 16 is provided with a direct or indirect connection to the Internet 22.

The method of the present invention is best understood by reference to FIG. 2, and is explained below.

The server computer 20 is linked to a dynamic directory on database 24, provided in a manner that is known. The server computer 20 is operable to store to the dynamic directory on database 24 certain specific information particularized below.

The server computer 20 is accessible from the Internet or Intranet with a public or LAN/WAN IP address.

Figure 3A:
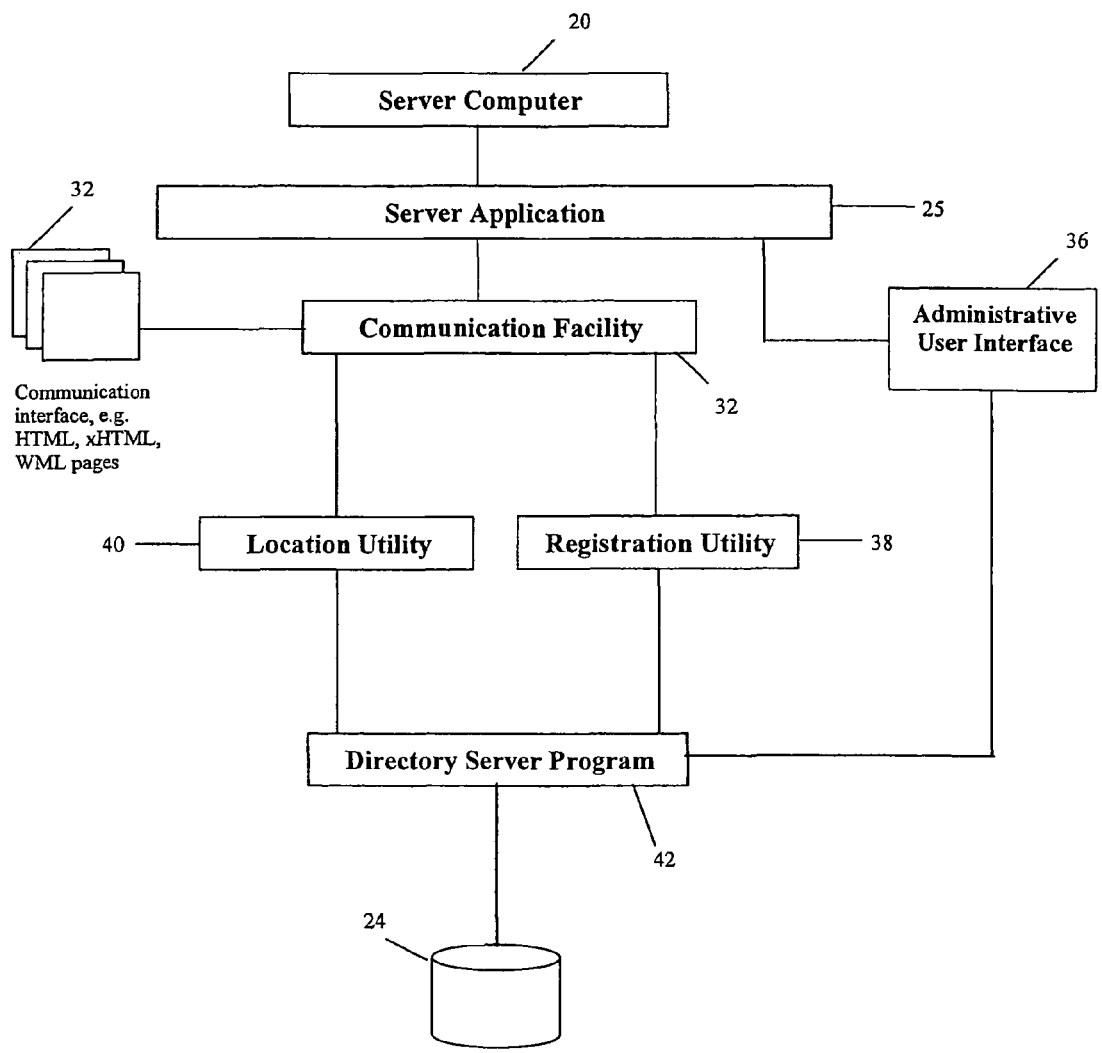
FIG. 3a is a program resource diagram illustrating the resources of the server application of the present invention.

In a particular aspect of the present invention, the server computer 20 is provided with a server application 25, as best illustrated in FIG. 3a, whereby the server application 25 provides means to the server computer 20 to create and send one or more requests to the proxy computer(s) 26 connected to the computer network 12. The server computer 20 further consists of a dynamic directory (not shown) stored on dynamic directory on database 24.

The dynamic directory on database 24 is operable to store identification/authentication information such as, but not limited to, the following: (a) a unique account identifier (e.g. activation code) for each target computer 28 (particularized below) and proxy computer 26; (b) a unique computer identifier (e.g. computer name) for each target computer 28; (c) a network identifier for each target computer 28 (e.g. a MAC address defined for the target computer 28 on the computer network 12); (d) the authentication information (e.g. password) for each of the target computer 28; and (e) the location on the Internet relative to the server computer 20 for each proxy computer 26 (i.e. a public/LAN IP address for the proxy computer 26, or a current communication session between the proxy computer 26 and the server computer 20).

The server computer 20 further includes means for providing a communication interface 32 (e.g. HTML/xHTML/WML pages) for managing (e.g. creating, removing, and modifying) account information for each of the target computer 28 and proxy computer 26 such as, but not limited to, authentication information. The communication interface 32 by operation of the communication utility 34, as illustrated in FIG. 3a.

The target computer 28 is operable to create and send one or more communication to the server computer 20 to update its unique computer identifier (e.g. computer name) and its associated network identifier (e.g. MAC address defined for it on the computer network 12).

The proxy computer 26 is linked to the Internet with its location on the Internet relative to the server computer 20 being defined as either (i) a public addressable IP address, or (ii) a publicly un-addressable LAN/WAN IP address. The proxy computer 26 is operable to create and send on an intermittent basis one or more communications to the server computer 20 that include the current public or LAN/WAN IP address of the proxy computer 26. This process ensures that the current location of the proxy computer 26 on the Internet relative to the server computer 20 is updated in the dynamic directory on database 24 (i.e. a public or LAN/WAN IP address for the proxy computer 26, or a current communication session between the proxy computer 26 and the server computer 20).

In one aspect of the present invention, at least one of the computers 10 is designated as a proxy computer 26 (illustrated in FIG. 1 as one particular one of the computers 10a, 10b, 10c etc.). The proxy computer(s) 26 is/are operable to send the intended digital signal(s) to one of the computers 10a, 10b, 10c etc. for which the signal is intended. This particular computer, for the sake of illustration, is referred to in this disclosure as a target computer 28 (illustrated in FIG. 1 as one particular one of the computers 10a, 10b, 10c etc.). The target computer 28 shall not be the same computer as the proxy computer 26. However, arrangements are possible whereby the proxy computer 26 consists of computer 10a, but computer 10a is also target computer 28 when, for example, computer 10b is the proxy computer 26 relative to computer 10a acting as the target computer 28.

The term "digital signal" in this disclosure is used generally and means any binary communication. In many specific implementations the "digital signal" consists of a datagram.

The proxy computer(s) 26 must be "always on"—i.e. ready to receive communication from the server computer 20. The proxy computer(s) 26 is/are operable to send the digital signal to the target computer 28 on behalf of the server computer 20, as further explained below.

Accordingly, it should be understood that the computer network 12 includes at least two computers: one to act as the proxy computer 26 and another computer to act as the target computer 28. It should also be understood that the present invention contemplates multiple proxy computers 26 and multiple target computers 28, and the singular and plural are used interchangeably to send digital signal(s) to such elements of the invention.

The digital signal(s) to be sent to a target computer 28 via the proxy computer(s) 26 may consist of any type of signal including but not limited to HTTP/HTTPS or "WAKE-UP ON LAN", but also more complex digital signals such as PING, H.323, or any datagram(s), etc.

In a particular aspect of the present invention, the target computer(s) 28 are each operable to receive and process digital signal(s), including preferably in the "SLEEPING/STAND-BY MODE" and the "SHUTDOWN MODE", or their equivalents. In one particular embodiment of the present invention this is achieved by operation of the basic input/output system (or BIOS) that is generally provided to computers, and also a network adapter (NIC) also generally provided to computers connected to a LAN. In a particular embodiment of the present invention, the known "WAKE-UP ON LAN" feature is utilized, which tends to be supported by the BIOS and NIC provided to most computers.

The digital signal(s) sent by the proxy computer(s) 26 to the target computer(s) 28 therefore is/are processed by the means provided to the target computer 28 to receive and process digital signal(s).

Figure 2:
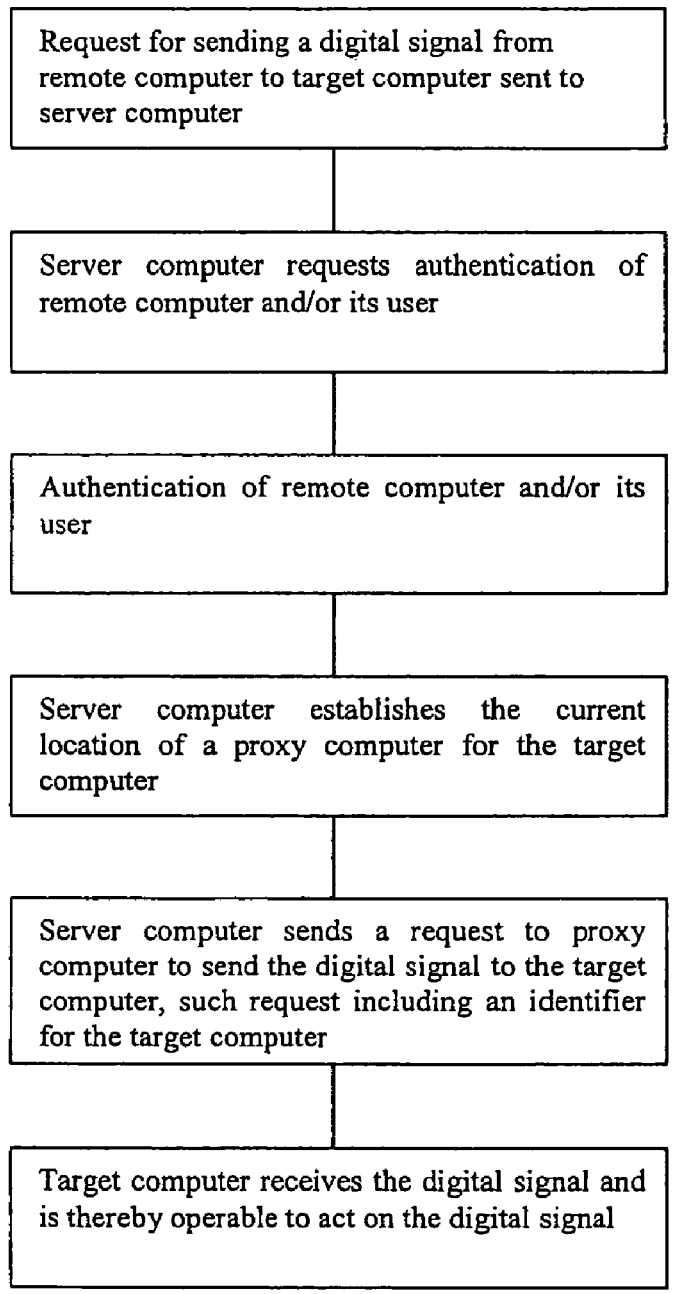
FIG. 2 is a workflow diagram illustrating the method of the present invention, in one aspect thereof.

As best shown in FIG. 2, remote sending of digital signal(s) to the target computer 28 from the remote computer 16 is initiated by a request for sending of digital signal(s) from the remote computer 16 to the server computer 20. This request will contain a computer identifier that is associated with the target computer 28 (e.g. computer name). Preferably, the server computer 20 in response will request authentication of the user associated with the target computer 28 and/or the remote computer 16 itself. This is achieved, for example, by the user providing to the server computer 20 a computer identifier of the target computer 28 (e.g. computer name) and an authentication information (e.g. password). Other authentication means are contemplated. The server computer 20 is responsive to the request for sending of digital signal(s): (a) to look up from the dynamic directory on database 24 a then current location on the Internet for the proxy computer(s) 26 (as particularized above), and (b) send the request to the proxy computer(s) 26 for actually sending the digital signal(s) to the target computer 28. The request to the proxy computer(s) 26 preferably includes the network identifier of the target computer 28 and optionally the digital signal(s) to be sent to the target computer 28.

In response, the proxy computer(s) 26 is/are operable to send the digital signal(s) to the target computer 28. In the context of most local computer networks, the target computer 28 recognizes the digital signal(s) as emanating from the proxy computer(s) 26, i.e. one of the computers that is part of the computer network 12, and therefore the target computer 28 is operable to act on the digital signal(s). In other words, the target computer 28 is "aware of" the proxy computer(s)

26. In a particular aspect of the present invention, because the digital signal(s) are preferably interoperable with the BIOS, the target computer 28 is operable to act on the digital signal(s) whether the target computer 28 is in the "POWERED UP MODE", "SHUTDOWN MODE", or "SLEEP/STAND-BY MODE". In a particular aspect thereof, the present invention is operable to enable a "WAKE-UP ON LAN" signal or a functionally similar signal to the target computer 28, initiated by a request from the remote computer 16, even if the target computer 28 is blocked from accessing or accessed by any computer outside of the computer network 12.

The interactions between each of the server computer 20, proxy computer(s) 26, target computer(s) 28, and the remote computer 16, in a particular embodiment thereof, are described in greater detail below under the headings: "Server Computer", "Proxy Computer", "Target Computer" and "Remote Computer" below.

Server Computer

In a particular embodiment of the present invention, the server computer 20 is operable to provide real-time authentication and verification, by operation of the server application 25 (illustrated in FIG. 3a), i.e. this function is provided by server computer 20 and not by proxy computer 26. In other words, in one particular implementation of the present invention, the proxy computer 26 does not store registration information, nor does it authorize the remote computer 16 to send digital signals to the target computer 28.

The server computer 20 preferably includes the resources particularized below, provided by the server application 25.

An administrative user interface 36 (e.g. HTML/xHTML/WML) that enables an administrator to create and manage accounts. Each account typically has a unique identifier (e.g. activation code). The account information is stored on the dynamic directory provided on dynamic directory on database 24. Information about whether the account is intended to be a proxy computer 26, a target computer 28, or both is also kept on this dynamic directory on database 24. Optionally, authentication information is associated with each account (e.g. password) or other authentication means. It should be understood that various authentication technologies can be provided on server computer 20 and integrated in the overall solution described herein in a manner that is known.

The server computer 20 is accessible on the Internet or Intranet by a public or local IP address (e.g. www.server.abc.com or any IP address).

The server application 25 includes a registration utility 38 that is operable to permit the proxy computer 26 to register itself on the server computer 20 (and specifically to the dynamic directory on database 24) during activation time (as explained below) and update itself to the server computer 20 intermittently thereafter. This aspect of registration that is enabled by the registration utility 38 is for the purpose of updating the location of the proxy computer 26 relative to the server computer 20 so that the server computer 20 can communicate with the proxy computer 26 required. The registration utility 38 is further operable to permit the target computer 28 to register itself on the server computer 20 (and specifically on the dynamic directory on database 24) during activation time and update itself to the server computer 20 intermittently thereafter. This aspect of registration that is enabled by the registration utility 38 is for the purpose of updating the network identifier of the target computer 28 (e.g. MAC address), the computer identifier (e.g. computer name) or an optional additional password chosen by the target computer 28 at time of registration, as applicable.

The server computer 20 further includes a communication interface 32 (e.g. HTML/xHTML/WML) for responding to requests from the remote computer 16 to initiate requests to create and send digital signal(s) to the target computer 28. After being authenticated and verified of the existence of the target computer 28, the server computer 20 will locate the proxy computer(s) 26 by operation of the location utility 40 and send a request to one or more of the available proxy computer(s) 26 to send the intended digital signal(s) to the target computer 20.

The server application 25 also includes a directory service program 42 linked to the dynamic directory on database 24 that is operable to manage the storage and retrieval of the various identifiers, activation codes, passwords and other data referred to in this disclosure.

It is important to note that in accordance with a preferred embodiment of the present invention the server computer 20 is operable to send the digital signal(s) to the target computer(s) 28, however, the server computer 20 need not create the communication channel between the remote computer 16 and the target computer(s) 28 and/or between the remote computer 16 and the proxy computer (26), although as particularized below this is contemplated as an alternate embodiment of the present invention.

When the server computer 20 needs to send a request to a proxy computer 26, the location utility 40 provides means for the server computer 20 (a) determining the current location (IP address or current communication session with the server computer 20) of the one or more proxy computer(s) 26 and (b) creating and sending the digital signal to one or more of the proxy computer(s) 28.

Proxy Computer

In another aspect of the present invention, a computer program (referred to as proxy computer program 44, illustrated in FIG. 3a) is loaded on or otherwise linked to the each proxy computer 26. The proxy computer program 44 is operable to register and maintain the registration of the proxy computer 26 to the server computer 20, as described above. In a particular embodiment of the proxy computer program 44 of the present invention, such computer utility is operable to: (a) initiate communication between the proxy computer 26 and the server computer 20 (by operation of communication utility 45), and (b) initiate an activation process (provided by operation of a registration routine, in one particular embodiment) by providing its activation code to the server computer 20. The activation process is operable on the proxy computer 26 to activate the proxy computer 26 in its role as proxy as particularized herein, provided that the server computer 20 by reference to the dynamic directory on database 24 identifies the activation code as being valid and associated with a proxy computer 26. If said activation code does not identify a proxy computer 26 but rather a target computer 28, for example, then the registration routine will fail. It should be understood that is possible that the activation code identifies the computer 10 in question as being both a proxy computer 26 and a target computer 28 (relative to another proxy computer 26).

Assuming the computer 10 designated to act as proxy computer 26 has been activated as a proxy computer 26, it will create and send an additional communication to the server computer 20 including its location, i.e. its public or LAN/WAN IP address or the current communication session with the server computer 20 to allow the location utility 40 at the server computer 20 to "find" the proxy computer 26 when the server computer 20 requires this, as explained above. This "registration" process is performed intermittently to ensure its location is always being updated on the dynamic directory on database 24.

The proxy computer 26 is operable to act for the server computer 20 as a proxy to send digital signal(s) to the target computer 28 because the proxy computer 26 and the target computer 28 are in a "trusted environment" of a local interconnected computer network such as a LAN whereas the server computer 20 is generally outside of such network in an untrusted environment. In most implementations, the proxy computer 26 actually broadcasts the digital signal to all computers 10 but only the target computer(s) 28 receive the unique network identifier, in many applications of the present invention.

Target Computer

Figure 3B:
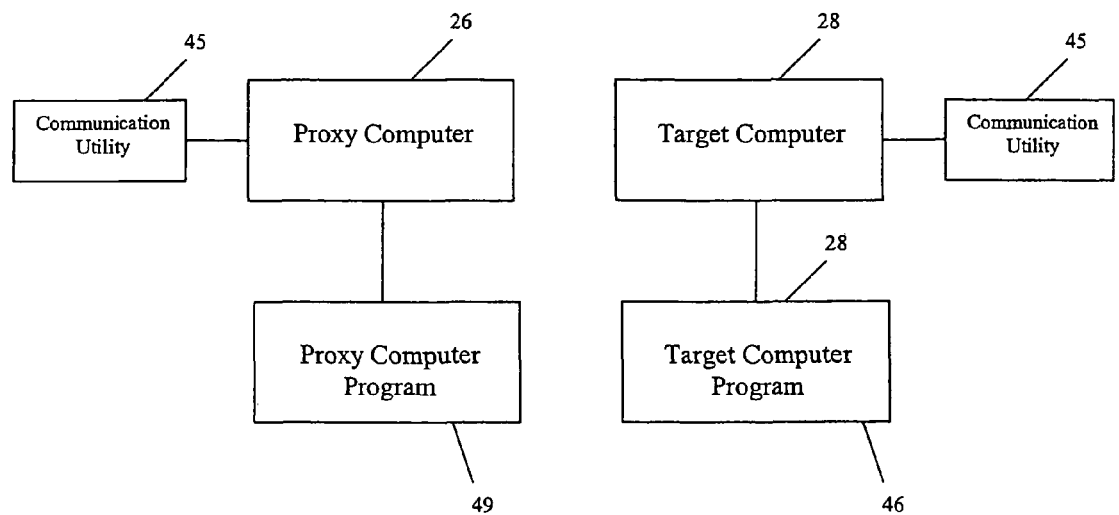
FIG. 3b is a program resource diagram illustrating the resources of the program resident on the proxy computer/target computer.

In another aspect of the present invention, a computer program (referred to as a target computer program 46, also illustrated in FIG. 3b) is loaded or otherwise linked to each target computer (28), in a particular embodiment of the present invention. The target computer program 46 is operable to register and maintain the registration of each target computer 28 to the server computer 20, as described above. In a particular embodiment of the present target computer program 46 of the present invention, such computer utility is operable to: (a) initiate a communication between the target computer 28 and the server computer 20 (by operation of communication utility 45), and (b) initiate an activation process provided by operation of a registration routine, in one particular embodiment) by target computer 28 providing to server computer 20 a valid activation code. It should be understood that while the target computer 28 may not be publicly addressable, it is nonetheless typically operable to communicate with the server computer 20, e.g. via the Internet. The registration routine is operable on the target computer 28 to activate the target computer 28 in its role as a target computer 28, as defined herein, provided that the server computer 20 by reference to the dynamic directory on database 24 identifies the activation code as being valid and associated with a target computer 28. If said activation code does not identify a target computer 28 but rather a proxy computer 26 or a computer not recognized to obtain the solution of the present invention, then the registration routine will fail. It should be understood that is possible that the activation code identifies the computer 10 in question as being both a target computer 28 and a proxy computer 26 (relative to another target computer 28).

During registration/activation, the server computer 20 is operable to enable a computer identifier (e.g. computer name) to be provided for the target computer 28, either automatically by retrieving data from the target computer 28 or by means of input from a user of the target computer 28, so long as the computer identifier has not been used by another target computer 28 that is part of computer network 12.

Assuming the target computer 28 in question has been activated as a target computer 28, it will create and send another communication to the server computer 20 that includes its network identifier (e.g. MAC address) as well as its computer identifier, if applicable, to allow the location utility 40 to establish a digital signal such that the digital signal redirected by the proxy computer 26 can be received/processed by the target computer 28 intended by the user of the remote computer 16. The target computer program 46 is operable to initiate the registration routine intermittently to ensure that the network identifier and computer identifier, if applicable, are updated on the dynamic directory on database 24.

Once registered/activated, the target computer 28 sits and waits to receive digital signals from the proxy computer 26 intended for the target computer 28.

Remote Computer

The remote computer 16 typically does not require special programming other than some means of contacting the server computer 20 and providing certain data to the server computer 20 sufficient for server computer to identify the particular target computer 28 to which the user of the remote computer 16 intends to have a digital signal delivered to. For example, an Internet browser, mini-browser or WAP browser (not shown) loaded on the remote computer serves this purpose. The server computer 20 will typically prompt for a computer identifier (e.g. computer name) as well as optional authentication information (e.g. password). After the remote computer 16 and/or the user thereof being authenticated, and the existence of the requested target computer 28 being verified by the server computer 20 (by operation of the location utility 40), the server computer 20 by operation of location utility 40 locates the proxy computer(s) 26 and send a request to one or more available proxy computer(s) 26 to send digital signal(s) to the target computer(s) 28 in question.

In one particular implementation of the present invention, the digital signal(s) consists of a wake up signal that is operable to "POWER UP" the target computer 28 from its "SHUTDOWN MODE", or wake it from "SLEEP/STAND-BY MODE". This is useful in applications where accessing and/or controlling of the target computer 28 from the remote computer 16 requires that the target computer 28 be "POWERED UP" or "AWAKE" from "SLEEP/STAND-BY MODE". This is the case in certain applications involving accessing and/or controlling of the target computer 28, including but not limited to certain remote access/remote control applications. For example, once the target computer 28 is "POWERED UP", remote access/control of the target computer 28 from the remote computer 16 is possible based on a solution such as the "I'M IN TOUCH™" solution of 01 Communique Inc, even if the target computer 28 is blocked from accessing or accessed by any computer outside of the computer network 12. For clarification purposes, it should be understood that a particular aspect of the present invention is whereby the solution disclosed herein is operable to activate the target computer 28 to a state in which a communication session or channel can be established between the remote computer 16 and the target computer 28, including for the purposes of accessing and/or controlling, including but not limited to remote access/remote control.

It should be understood that the term "accessing" and/or "controlling" (or "access" and/or "control" in this disclosure is used in a functional sense to include: "accessing" functions or resources of a personal computer, "accessing" functions or resources linked to or accessible from the personal computer, and also "accessing" in the sense of "reaching" the target computer 28 that may not otherwise be "accessible"). In other words, the word "access" is clearly not limited to what is referred to as "remote access", which is a particular form of "access". "Controlling" means "controlling" the personal computer in the sense that the personal computer by means of such "control" acts on one or more commands from a user remotely. Application of such accessing and/or controlling includes but is not limited to reading/sending/replying/forwarding of emails, launching applications installed on the personal computer remotely, or remotely accessing data available from the personal computer. As another example, accessing and/or controlling is also involved in providing remote technical support and maintenance, which includes for example an IT resource remotely diagnosing the personal computer or performing maintenance tasks on a personal computer remotely.

The digital signal(s) that is transmitted to the target computer 28 by operation of the present invention can be used to initiate numerous operations on or communications with the target computer 28, based on the type of request from the remote computer 16. For example, the present invention is operable to enable the remote computer to monitor one or more states of the target computer 28, e.g. whether the target computer 28 is "ON" or "OFF", to obtain selected data from the target computer 28, or to initiate selected operations at the target computer 28. For example, the present invention is operable to enable an instant messaging session to be created between the remote computer 16 and the target computer 28, even if the target computer 28 is blocked from accessing or accessed by any computer outside the LAN or WAN.

It should be understood that in a particular implementation of the present invention, the features of the present invention can be integrated with the "Private Communication Portal" described in U.S. Pat. No. 6,928,479.

Further the present invention can be provided in conjunction with means for providing security to computer networks such as the utility described in U.S. Pat. No. 6,526,507, which can be provided as an added layer of security so as to protect the target computer 28 from digital signal(s) sent from unauthorized proxy computer(s) 26.

In a particular implementation of the present invention, each of the computers 10 of the computer network 12 is selected as a proxy computer 26 for the other computers 10 as target computers 28 where it is known that one of computers 10 is always "POWERED UP" or awake from the "SLEEP/STAND-BY MODE".

It should also be understood that the present invention contemplates certain digital signals being created on the proxy computer 26 and sent to the target computer 28 and also in other implementations the digital signal being created on the server computer 20 and merely redirected by the proxy computer 26 to the target computer 28. If the digital signal is being created on the proxy computer 26, then the proxy computer 26 will have means provided to create and assemble the digital signal. This means can also be included as part of the proxy computer program 44.

Although preferred embodiments of the invention have been described herein, it will be understood by those skilled in the art that variations may be made thereto without departing from the spirit of the invention or the scope of the appended claims.

The embodiments of the invention in which an exclusive property or privilege is claimed are defined as follows:

1. A method of enabling accessing or controlling of at least one target computer connected to a local computer network from at least one remote computer remote from the local computer network, comprising the steps of:
  (a) the at least one remote computer communicating with a server computer and sending to the server computer a request for the target computer to respond to or act on one or more digital signals, the server computer being linked to a database, and the server computer being operable to store data, receive data, send data, and retrieve data from the database for request processing and authentication of the at least one target computer utilizing the stored target data, or authentication of the remote computer; and
  (b) the server computer communicating with at least one designated proxy computer located in the local computer network and thereby being linked to the at least one target computer, said at least one proxy computer further being linked to the server computer;
  (c) the proxy computer sending one or more communications to the server computer so as to establish and maintain, or intermittently re-establish, a communication channel between the proxy computer and the server computer, such communication channel being maintained or intermittently re-established whether the proxy computer is publicly addressable or publicly non-addressable:
  (d) the server computer enabling one or more digital signals to be sent to the target computer based on the request from the remote computer, via the communication channel between the server computer and the proxy computer; and
  (e) the proxy computer delivering the one or more digital signals to the at least one target computer; and the target computer acting on the one or more digital signals to perform one or more of the following actions:
    (i) powering on or powering off the at least one target computer;
    (ii) waking the at least, one target computer from a sleep mode: or
    (iii) activating functions or resources of the at least one target computer including functions or resources for launching an application installed on the target computer, accessing data available from the target computer, providing technical support and maintenance, and any other functions or resources of the target computer; such that the at least one remote computer is operable to achieve functional access to, or control of, the at least one target computer.

2. The method of claim 1, comprising the further step of the at least one remote computer functionally accessing or controlling the at least one target computer that is otherwise non-accessible.

3. The method of claim 1, comprising the further steps of:
  (a) the at least one remote computer sending target data with the request, said target data identifying the at least one target computer; and
  (b) the server computer verifying the target data of the request and obtaining the location of a proxy computer associated with the target data.

4. The method of claim 3, comprising at least one of the further steps:
  (a) the proxy computer communicating with the server computer to provide the current location of the proxy computer to the server computer as proxy data via the communication channel;
  (b) the at least one target computer communicating with the server computer during activation and intermittently thereafter to provide one or more of the following as target data: network identifier, computer identifier, MAC address; or password; and
  (c) the at least one target computer acting on one or more commands from a user provided through the remote computer to perform any of the following functions: reading an email: sending an email; replying to an email; forwarding an email: launching an application installed on the target computer; accessing data available from the target computer; providing technical support and maintenance of the target computer, including diagnosing the target computer and performing maintenance tasks on the target computer.

5. The method of claim 3, comprising the further steps of the server computer storing proxy data, target data, identifications, activation codes, passwords and other data in the database, and the server computer retrieving data from the database to perform one of the following steps:
  (a) identifying the current location of the proxy computer; or
  (b) identifying at least one of the following:
    (i) authentication information of the at least one target computer;

(ii) access information of the at least one target computer; or (iii) receiving and processing information of the at least one target computer so that the one or more digital signals may be generated to be received and processed by the at least one target computer.

6. The method of claim 1, comprising the further step of waking, powering-on or powering off the at least one target computer utilizing at least one of the following: HTTP/HTTPS, the basic input/output system and network adapter of the at least one target computer; the wake-up on LAN feature of the target computer; or more complex digital signals including at least one of PING, H.323, or any datagram(s).

7. The method of claim 1, comprising the further step of the at least one remote computer sending at least one of the following to the server computer:
   (a) the network identification of the at least one target computer, whereby the server computer authenticates the at least one target computer to receive the request; or
   (b) a password corresponding to the at least one remote computer, whereby the server computer authenticates the at least one remote computer communicating the request.

8. The method of claim 1, comprising the further steps of:
   (a) the proxy computer performing at least one of the following steps:
      (i) generating the one or more digital signals in response to the request sent by the server computer; and
      (ii) utilizing the request data to establish, the one or more digital signals as receivable and processable by the at least one target computer; and
   (b) the proxy computer sending the one or more digital signals from the proxy computer to the at least one target computer.

9. The method of claim 1, comprising at least one of the further steps of:
   (a) generating the one or more digital signals by at least one of the following steps:
      (i) the at least one remote computer generating the one or more digital signals and sending the one or more digital signals to the server computer, and
      (ii) the server computer performing at least one of the following steps:
         (A) generating the one or more digital signals in response to the request sent by the at least one remote computer; and
         (B) utilizing the request data to establish the one or more digital signals as receivable and processable by the at least one target computer;
   (b) the server computer sending the one or more digital signals to the proxy computer; and
   (c) the proxy computer sending the one or more digital signals via the proxy computer to the at least one target computer.

10. The method of claim 9, comprising the further step of the at least one remote computer sending the one or more digital signals to the server computer as part of the request.

11. The method of claim 1, comprising the further steps of the at least one target computer:
   (a) recognizing the one or more digital signals sent by the proxy computer on the local area network of the at least one target computer; and
   (b) acting upon the digital signals after recognizing the one or more digital signals.

12. The method of claim 1, comprising the further step of the at least one target computer acting upon the one or more digital signals and activating functions or resources that are linked to the at least one target computer.

13. A system for accessing or controlling at least one target computer connected to a local computer network from at least one remote computer remote from the local computer network, said system comprising:
   (a) a server computer linked to a database, said server computer being operable to store data, receive data, send data, and retrieve data from the database for request processing and authentication of the at least one target computer utilizing the stored target data, or authentication of the remote computer;
   (b) the at least one remote computer being linked to the server and being operable to request communication with the at least one target computer
   (c) at least one designated proxy computer located in the local computer network and thereby being linked to the at least one target computer, said at least one proxy computer further being linked to the server computer; and the proxy computer and the server computer are configured so that the proxy computer is operable to send one or more communications to the server computer so as to establish and maintain, or intermittently re-establish a communication channel between the proxy computer and the server computer, such communication channel being maintained or intermittently re-established whether the proxy computer is publicly addressable or publicly non-addressable;
   the server computer is operable to enable one or more digital signals to be sent to the target computer based on a request from the remote computer, via the communication channel between the server computer and the proxy computer, and the proxy computer is operable to deliver the one or more digital signals to the at least one target computer and the target computer is operable to receive and act upon the one or more digital signals to perform one or more of the following actions:
      (i) powering on or powering off the at least one target computer;
      (ii) waking the at least one target computer from a sleep mode; or
      (iii) activating functions or resources of the at least one target computer including functions or resources for launching an application installed on the target computer, accessing data available from the target computer, providing technical support and maintenance, and any other functions or resources of the target computer;
   such that the at least one remote computer is operable to achieve functional access to, or control of, the at least one target computer.

14. The system of claim 13, wherein the database is, a dynamic directory operable to store and manage data, and said data stored in the dynamic directory is retrievable by the server computer.

15. The system of claim 13, wherein the at least one target computer is operable to provide target data to the server computer intermittently, and said target data includes at least one of the following: unique computer identification; associated network identification; or one or more passwords.

16. The system of claim 13, wherein the at least one proxy computer is operable to provide the proxy data to the server computer intermittently.

17. The system of claim 13, wherein the at least one remote computer, the at least one target computer and the server computer are directly or indirectly connected to the Internet.

18. The system of claim 13, wherein at least one of the local computer network and the at least one remote computer is behind a firewall.

19. The system of claim 13, wherein the one or more digital signals are one or more binary communications.

20. The system of claim 13, wherein the server computer includes a registration utility operable to obtain the proxy data and the target data and a locating utility operable to respond to a request from the remote computer by determining the current location of the proxy computer by utilizing the proxy data and by sending a communication to the proxy computer that directs the proxy computer to send the at least one digital signal to the target computer.

21. The system of claim 13, wherein the server computer is at least one of the following: a group of interconnected servers; or one or more farms of multiple server computers.

22. The system of claim 13, wherein the at least one proxy computer is activated as a proxy computer and thereby designated to act as a proxy computer and said proxy computer remains in an active, ready state on a continuous basis.

23. The system of claim 13, wherein the at least one proxy computer has a proxy computer program loaded thereon, or is linked to the proxy computer program, said proxy computer program being operable to: initiate an activation process to register and maintain the registration of the at least one proxy computer to the server computer, said activation process including providing a proxy computer activation code to the server computer; and initiate communication between the at least one proxy computer and the server computer.

24. The method of claim 1, comprising the further steps of:
(a) the server computer authorizing the proxy computer in real-time utilizing the location of the proxy computer stored by the server computer; and
(b) the server computer authorizing the target computer in real-time utilizing the target data of the target computer stored by the server computer.

25. The method of claim 1, comprising the further steps of: defining the at least one proxy computer connected to the local area network and any other one or more computers connected to the local area network as LAN computers; the at least one proxy computer sending the one or more digital signals to the LAN computers; the at least one target computer being the only LAN computer responding to the one or more digital signals.

26. The method of claim 1, comprising the further steps of: the at least one target computer communicating target data that includes one or more of the following: a network identifier of the target computer; a computer identifier of the target computer; or an optional additional password chosen by the target computer.

* * * * *